(12) United States Patent
Kennett et al.

(10) Patent No.: US 8,807,443 B2
(45) Date of Patent: Aug. 19, 2014

(54) PET ACTIVITY MONITOR

(76) Inventors: Robert Kennett, Bedford, NH (US); Timothy Byrd, Goffstown, NH (US)

( * ) Notice: Subject to any disclaimer, the term of this patent is extended or adjusted under 35 U.S.C. 154(b) by 7 days.

(21) Appl. No.: 13/558,754

(22) Filed: Jul. 26, 2012

(65) Prior Publication Data

US 2013/0186962 A1 Jul. 25, 2013

Related U.S. Application Data

(60) Provisional application No. 61/511,959, filed on Jul. 26, 2011.

(51) Int. Cl.
*G06K 19/06* (2006.01)

(52) U.S. Cl.
USPC .......................................... 235/494; 235/487

(58) Field of Classification Search
USPC .................................. 235/380, 375, 494, 487
See application file for complete search history.

(56) References Cited

U.S. PATENT DOCUMENTS

| | | | |
|---|---|---|---|
| 2012/0203076 A1* | 8/2012 | Fatta et al. | 600/300 |
| 2012/0221254 A1* | 8/2012 | Kateraas et al. | 702/19 |
| 2013/0146659 A1* | 6/2013 | Zhou et al. | 235/380 |
| 2013/0183952 A1* | 7/2013 | Davis et al. | 455/418 |

\* cited by examiner

*Primary Examiner* — Karl D Frech
(74) *Attorney, Agent, or Firm* — NextWave IP Legal Services, LLC; Leon Fortin, Jr.

(57) ABSTRACT

A pet activity monitor with a multi-axis motion detector for facilitating derivation of physical activity data, wherein the pet activity monitor is adapted to display a QR-code comprising a representation of the physical activity data.

19 Claims, 8 Drawing Sheets

EXEMPLARY DIRECTION(S) OF MOTION THAT CAN BE DETECTED

PET ACTIVITY MONITOR

CROSS-REFERENCE TO RELATED APPLICATIONS

This application claims the benefit of U.S. provisional application Ser. No. 61/511,959 filed Jul. 26, 2011, which is hereby incorporated by reference in its entirety.

BACKGROUND OF THE INVENTION

1. Field

The methods and systems described herein relate to health and nutrition of animals and more specifically to pet activity monitoring.

2. Description of the Related Art

There is a growing range of nutrition options for pet owners that have general guidelines for feeding based on pet size/weight/species (e.g. cats under 6 pounds, dogs between 25-50 pounds, and the like). Pet food providers desire to have improved touch points with pet owners that may include personalization that generally is not possible with mass media approaches. At least one reason for improved touch points is to guide the pet owner/care taker towards premium and/or customized selections that meet individual needs, such as for an overly active pet and/or a less active pet.

Pet activity may vary throughout the day and with many pets being separated from their owners for much of the day, observational data may result in an assessment of pet activity that is largely inaccurate. Commercial operations, such as ranches and the like depend on quality levels of nutrition while avoiding waste and keeping costs under control. These operations may involve the care and feeding of a large number of animals may not find it economical to monitor animal activity through observation alone.

SUMMARY OF THE INVENTION

The pet activity monitor described herein may provide a non-impact, low cost, reliable, and portable means for capturing pet activity over time that may benefit pet owners, pet food suppliers, retailers, commercial animal operations, and the like in facilitating determination of important relationships between pet food type, intake, and the like with pet health. An environmentally tolerant device that can be used with any type of pet collar, harness, and the like may monitor pet activity through detection of pet motion. Motion sensors in the pet activity monitor device may indicate motion of the device in response to pet motion (e.g. standing from a sitting position, turning over, running, walking, etc.). Transmission of collected information, such as for use by a networked server or the like may be performed through visual display (e.g. display of a QR code) and/or wireless communication (e.g. NFC or other short-range wireless signal transmission).

Methods and systems of monitoring pet activity described herein include a pet activity monitor with a multi-axis motion detector for facilitating derivation of physical activity data, wherein the pet activity monitor is adapted to display a QR-code comprising a representation of the physical activity data. The representation of the physical activity data may comprise one or more of an encoded and a compressed version of the collected physical activity data. The representation of the physical activity data may comprise at least two portions including an activity data portion and an identification data portion. The pet activity monitor may be adapted to be attached to a pet collar. In these methods and systems, the multi-axis motion detector comprises a plurality of accelerometers, each accelerometer configured with a programmable acceleration trigger threshold value and to generate an acceleration trigger when acceleration detected by each accelerometer exceeds the acceleration trigger threshold.

Methods and systems of monitoring pet activity described herein include a physical activity monitoring and display device adapted to be worn by a living being, wherein the device is adapted to display a QR-code comprising identification and physical activity information of the wearer. In these methods and systems, the QR-code comprises an encoded representation of the physical activity information. Further in these methods and systems, the physical activity monitoring and display device comprises a motion sensing sub system for detecting acceleration of the wearer along a plurality of axes, and wherein the physical activity information of the wearer is derived therefrom.

Methods and systems of monitoring pet activity described herein include a method of QR code generation for presentation on an electronic display of a pet activity monitor. The method of QR code generation may include capturing acceleration data for a plurality of axes; analyzing the captured acceleration data to determine physical activity of a pet associated with the pet activity monitor; encoding the physical activity as a physical activity data set; generating a QR code that represents the physical activity data set and at least one other type of data; and presenting the QR code on a display of the pet activity monitor. In these methods and systems, capturing acceleration data comprises receiving a trigger from an accelerometer that indicates that acceleration along an acceleration detection axis exceeds an acceleration trigger threshold value. Also, the acceleration trigger threshold is adaptively adjusted by a processor based on frequency of occurrence of receiving a trigger.

Further in this method, analyzing the captured acceleration data to determine physical activity data comprises processing acceleration data for a plurality of axes and time data related thereto with a model of pet activity.

In this method, the at least one other type of data represented by the QR code is identification data of at least one of the pet and the pet's caretaker.

This method may further comprise generating a pet-food related recommendation for a pet associated with the pet activity based on the physical activity data of the pet. The QR code comprises data representing the pet-food related recommendation.

Yet further in this method, the display of the pet activity monitor includes an array of pixels that accommodate presenting at least a version 1 QR code in its entirety. In particular, the display of the pet activity monitor is configured with an array of pixels having twenty-one rows and twenty-one columns.

The pet activity monitor of the current method comprises a processor electrically connected to a motion sensor sub system and a display, wherein a battery powers each of the processor, motion sensor sub system, and display. The motion sensor sub system comprises one or more of multi-axis accelerometers and single-axis accelerometers.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION OF THE PREFERRED EMBODIMENT(S)

Figure 1:
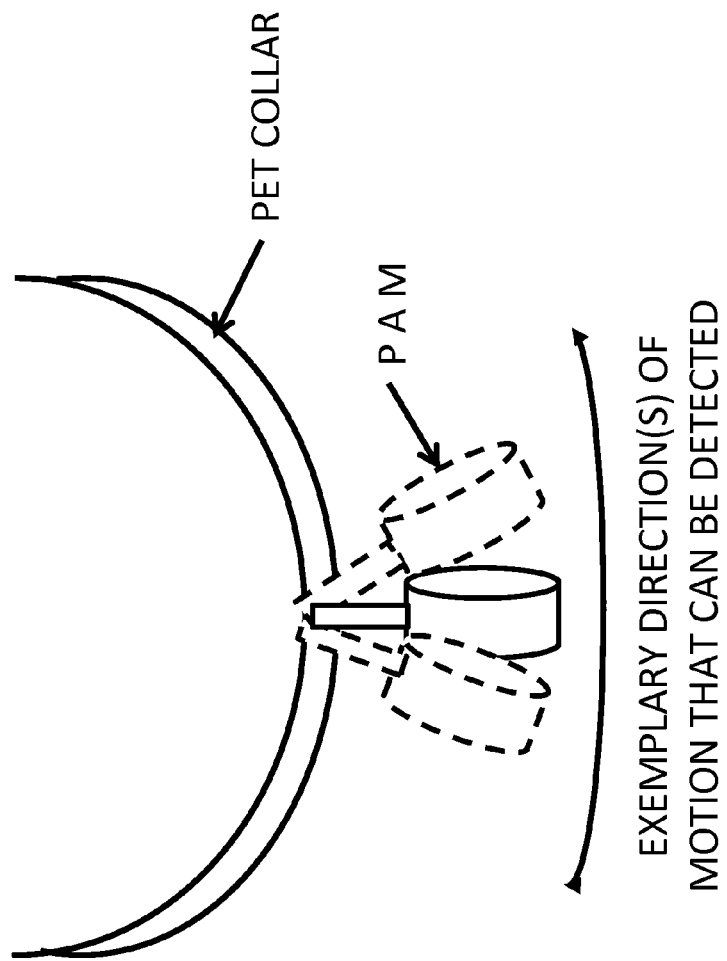
FIG. 1 depicts a deployment of a pet activity monitor showing exemplary directions of motion that can be detected.

A Pet Activity Monitor ("PAM") may be an electronic monitoring device and method of detecting motion that may be attached to a pet collar or harness (e.g. a dog, cat, horse, cattle, or other animal/pet). The PAM may monitor activity for the purpose of making dietary recommendations, among other things. The device may include an accelerometer subsystem, processor/memory, display (e.g. LCD), a battery or other power source, and any other elements suitable for such purpose housed in an environmentally tolerant housing. It may run continuously once activated, such as with a sealed battery providing power for up to one year or more, after which the device may be thrown away, returned for data harvesting, recycled, or the like. Other embodiments including a replaceable battery option, a rechargeable battery option, and the like may be disclosed.

The processor may continuously monitor motion information from the accelerometer subsystem, reducing it with a proprietary algorithm, and correlating motion to typical pet activities (i.e. 'playing' or 'resting'). A method for entering the pet's weight (and optionally other pet aspects such as breed, etc.) into the device may be provided. Given at least the weight, and monitored frequency and intensity of activity, a PAM can generally infer the calorie requirements of the pet, and communicate pertinent dietary information and the like about any specific brand or pet food product to the user. Such information may be presented through the display as a QR code and the like.

Options would include a replaceable battery and/or a means to directly or indirectly connect the PAM to a computer, such as to further process the data (e.g. accelerometer information and/or algorithmically reduced data), or link via a network to a central database. The data connection could be through wireless, wired, contact, capacitive, magnetic, NFC, dynamic QR code display, and any other suitable connection means.

The PAM may include (i) a Passive RFID tag to uniquely identify the pet and integrate with existing pet tracking and recovery services (such as PetMaxx or Pet Link); (ii) Low power ISM band RF beacon to enable a separate receiver to locate the pet within short ranges or provide an alert when the pet moves beyond the reception range; (iii) A 'docking station' or 'option module' that would snap or otherwise physically mate with the PAM to provide additional features.

In addition to providing food recommendations and/or guidance, the PAM may also facilitate monitoring overall pet health, verifying that a pet receives proper exercise (e.g. while being boarded), facilitate novelty games based on pet motion, motion alarm for training, and the like.

Through innovative device design for manufacturability, the PAM may be suitable for high volume production at a very low cost. A benefit of such low cost may include enabling the device being given away as a promotional item, such as with a separate purchase.

Partnership and marketing opportunities for the PAM may include customizing versions of the PAM for pet food producers, such as premium dog food companies so that the device may be configured with a database of dietary food choices and related business rules for aligning food and nutrition recommendations with the partnered pet food producer's products. Information such as branding, promotional messages, and the like may be configured into the PAM memories so that these can be displayed on the PAM display for the pet owner's information. A variety of customization and configuration options may be available for ensuring each partner's business goals and customer satisfaction goals can be met. In an example, pet food producer ACME may have a line of dog food that includes premium selections for specialty uses, such as for dogs that are naturally extremely active (e.g. dogs that spend many hours per day in an environment with other dogs that may prompt a high degree of activity). ACME's customized version of the PAM may include ACME logos, nutrition information for the full line of food, and promotional information for the premium selections. In this example, the PAM may use this ACME customized data set to present recommendations for the various food choices while emphasizing the premium selections.

Once the pet activity data is collected, along with other relevant information (e.g. dog breed, size, age, and the like), it may be transmitted as described herein to one or more networked servers where it may be aggregated and used by ACME for product improvement, and the like.

Benefits to the pet food manufacturer may include associating the brand with simple, reliable technology and positive pet health, guiding the consumer toward premium selections, and facilitating use of food that is no longer needed (e.g. due to a change in food based on device recommendation) by local dog shelters, etc.

The PAM may alternatively be produced without specific association with a pet food producer so that the user may gain the benefits of the device without being tied to a particular pet food producer. Such a configured PAM may be sold through general retail outlets.

Alternatively, the PAM may be adapted to address other medical and health markets, such as for critical care and/or other limited mobility patients.

The PAM may comprise elements such as: a custom housing, such as one made from molded plastic or the like, an LCD display suited for use on a pet-mounted device, a printed circuit board with electronics such as processor, memory, power, motion sensors, and the like, and a simplified user interface for configuration and/or general control of the PAM.

The PAM may be approximately one-inch square and/or one-quarter to one-half inch thick—similarly sized to a dog tag but slightly thicker. The PAM may be attached to a collar, harness or the like through a split ring similarly to a conventional dog tag. Alternatively, the PAM may be mounted directly to the collar and/or harness fabric. The display could face outwards and may occupy substantially the outward facing surface of the PAM. One or more buttons or other actuators may be present to facilitate configuring the PAM, such as with pet weight, age, breed, and the like. The PAM may further be water resistant and suitable for casual immersion (e.g. 3 ATM) so as to allow use in wet environments. Likewise the PAM may be designed to operate over a wide range of outdoor-like temperatures (e.g. −30 to +100 degrees F.)

The PAM may include devices and/or software to facilitate determining pet activity levels. In an embodiment, at least one 3-axis accelerometer subsystem, attached to a dog collar, may be sufficient to facilitate identifying a level of activity the pet is performing quantized to relatively few broad categories. Activity measurement over some reasonably small quantum may be typical of much larger periods. Therefore device may infer the type of activity the animal is engaged in from relatively small measurements, taken periodically but for small periods of time. These measurements may then be compared against an internal predetermined activity model for validation and/or adjustment in measurement quantum, and the like. Given at least an animal's weight, the PAM may process the data with algorithms that may facilitate determining an estimate of calories used to perform the activity over time. Among other things (e.g. breed, environmental factors, and the like) animal weight may be used to configure the model.

Throughout this specification reference is made to pet, and more generally to animal embodiments of the inventive activity monitor. However, the activity monitoring concepts, techniques, methods, and systems of monitoring, collecting, processing, displaying, transmitting, analyzing, storing, and other actions may equally be applied to monitoring human and/or non-human activity. In a non-limiting example, pet-related embodiments of the PAM being deployed on a collar may be equivalent to human-related embodiments of the PAM being deployed on a lanyard to be word around a person's neck.

Referring to FIG. 1, which depicts a deployment of a pet activity monitor showing exemplary directions of motion that can be detected, the PAM may be attached to a pet collar, such as a dog or cat collar so that the PAM is allowed to move in at least in a side to side motion for detecting an aspect of physical activity. The side to side motion may be a swaying or pendulum type motion that may facilitate detecting acceleration in at least one axis.

Figure 2:
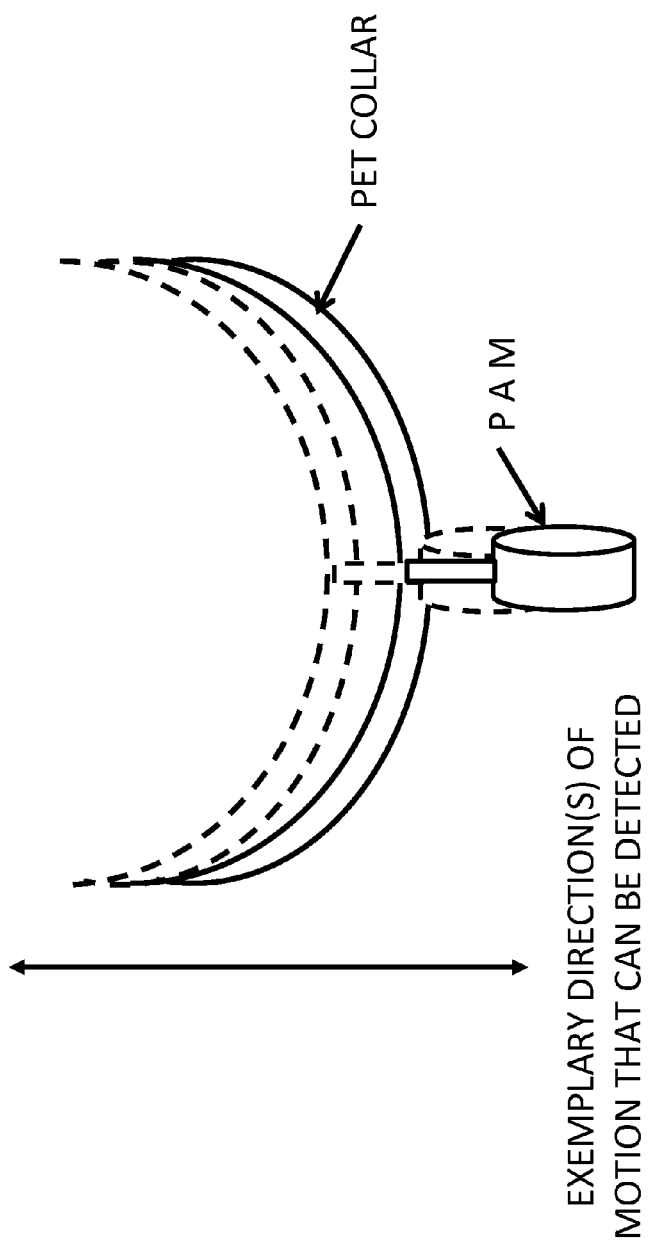
FIG. 2 depicts an alternate deployment of a pet activity monitor showing exemplary direction of motion that can be detected.

Referring to FIG. 2, which depicts an alternate deployment of a pet activity monitor showing exemplary direction of motion that can be detected, the PAM may be attached to a pet collar, such a dog or cat collar so that the PAM is allowed to move in an up and down motion for detecting an aspect of physical activity. The up and down motion may be in response to the pet collar (and therefore the pet) moving up and/or down that may facilitate detecting acceleration in at least one axis.

Figure 3:
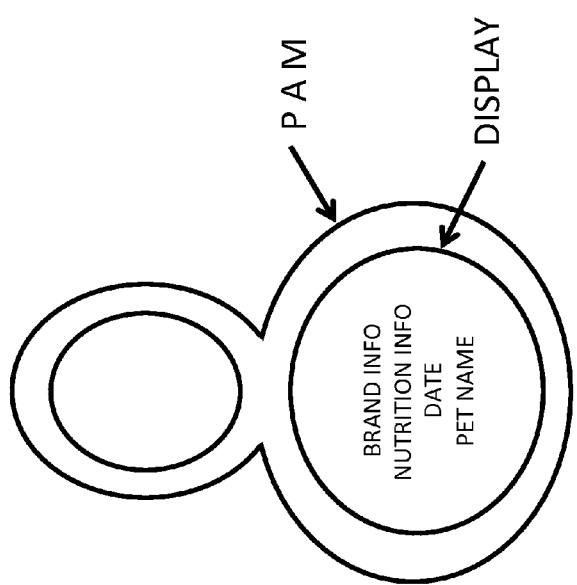
FIG. 3 depicts an embodiment of the pet activity monitor suitable for use with a animal collar, harness, and the like, including a display.

Referring to FIG. 3, which depicts an embodiment of the pet activity monitor suitable for use with a animal collar, harness, lanyard, and the like, including a display may include a first portion that is substantially a closed ring and a second portion attached to (or integral with) the first portion that may have a substantially disk or oval shape. The second portion may be disposed relative to the first portion so that when the first portion is attached to a pet collar, lanyard, and the like, the second portion hangs below the first portion. The PAM may have rounded edges and corners. The surfaces of the PAM may generally be curvilinear.

The second portion may optionally include a display that may be suitable for text, image, graphic, color, black/white, and the like presentation of information related to the pet and/or pet activity that may be sensed by the PAM. Information to be presented in the optional display may include brand information related to a pet food sponsor of the PAM, nutrition information related to a pet food selection that may be configured by the user and/or may be provided as a default food selection, date/time and related chronology (e.g. time of activity, time of rest), a pet name or other identification information, and the like.

Figure 4:
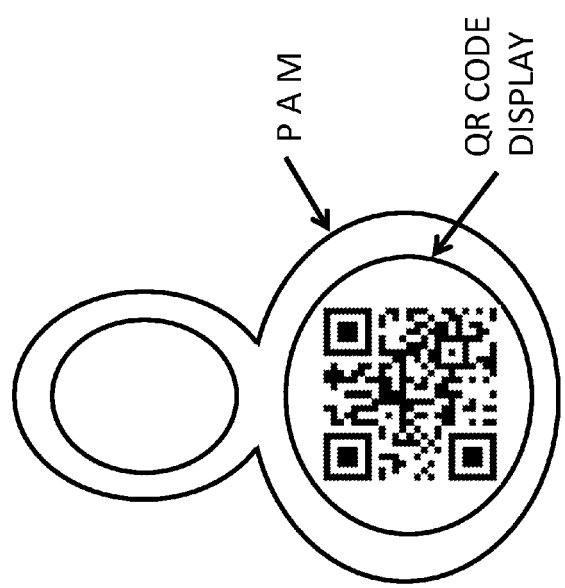
FIG. 4 depicts an embodiment of the pet activity monitor with a QR code display.

Referring to FIG. 4, which depicts an embodiment of the pet activity monitor with a QR code display, the PAM may include a low resolution LCD or other pixel addressable display that may support display of a QR code. The display may be provided in various sizes that may support a portion of the QR code versions. In an example, a 21×21 display may support QR code version 1, whereas a 177×177 display may support QR code versions 1 through 40.

Figure 5:
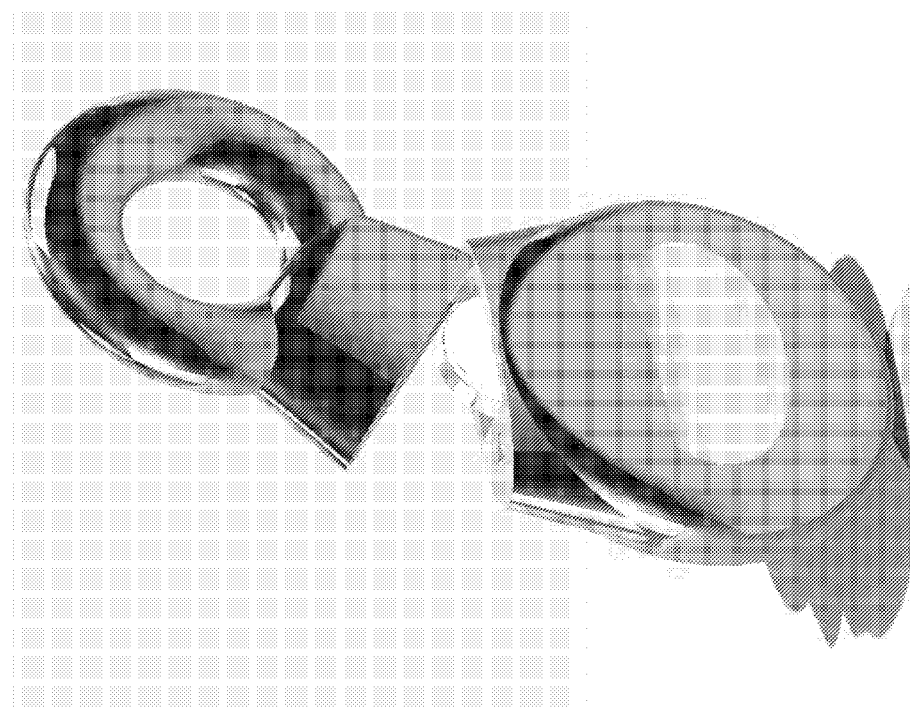
FIG. 5 depicts a three dimensional rendering of an embodiment of the pet activity monitor.

Referring to FIG. 5, which depicts a three dimensional rendering of an embodiment of the pet activity monitor, the PAM may be configured to have a separable first and second portions so as to facilitate access to a replaceable battery, such as a button-style battery or batteries. The PAM may further be constructed of material that is robustly suitable for outdoor use on a pet, animal, livestock, and the like. Although not depicted, the PAM may include buttons or other actuators for configuring portions of the PAM, such as pet age, weight, ID, and the like.

Figure 6:
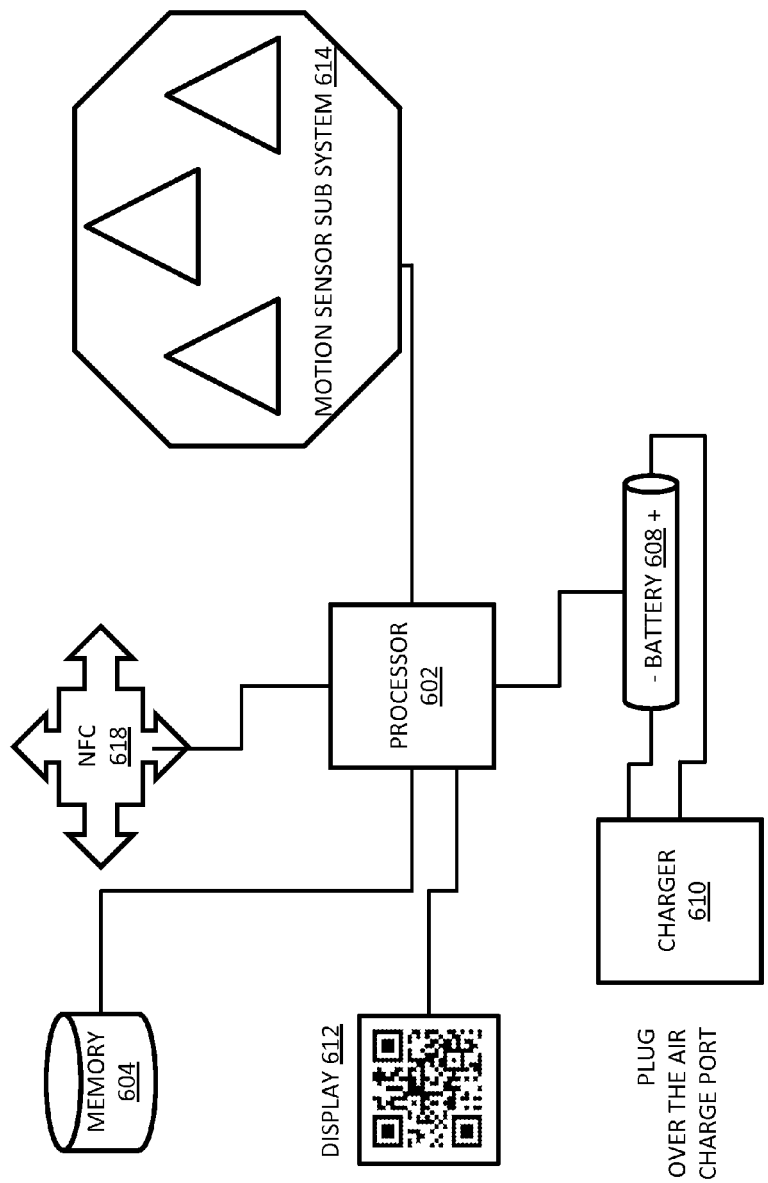
FIG. 6 depicts a schematic diagram including key components and functions of the pet activity monitor.

Referring to FIG. 6, which depicts a schematic diagram including key components and functions of the pet activity monitor, the PAM may include one or more circuits and electronic components for performing various functions such as processing data with a processor 602, storing configuration and pet activity-related data in a memory 604, detecting one or more axes of motion with a motion sensor sub system 614, communicating wirelessly with a short range wireless facility 618, presenting QR code and/or other information on a display 612, powering the PAM with a battery 608, charging the battery with a charger 610, substrates, interconnections, passive cooling, and the like. The memory 604 may be comprise non-volatile and/or volatile portions of memory, any of which may be integrated into the processor 602 or may be provided in a separate memory device or a combination thereof. The processor may be a device from a MICROCHIP PIC16 family, or other suitable microcontroller and/or array logic (e.g. a field programmable gate array, and the like). Suitable devices may have rudimentary math capabilities that may be used to provide robust pet activity data, while providing acceptable performance and battery life. The battery 608 may comprise an inexpensive coin-type power source (e.g. CR2016 coin cell) that may provide sufficient power budget for the PAM. The motion sensing sub system 614 may comprise one or more single or multi-axis accelerometers and optional support electronics. Power consumption of this sub-system ma be dominated by the accelerometers which may have very low power consumption, even while measuring motion. The highest power state is potentially when the accelerometer is communicating with the processor; therefore techniques are described herein for optimizing power efficiency of this sub system. The optional wireless communication facility 618 may support short-range wireless communication for receiving and/or transmitting configuration and/or activity-related information to another electronic device, such as a mobile phone that may be equipped with software to facilitate further analysis or communication of the information over a network.

The charger facility 610 may comprise electronic components and/or software for detecting a source of external power and providing that power in a suitable format (e.g. proper voltage and current) to a battery or other rechargeable power source of the PAM. The charger facility 610 may automatically detect an external power source that is plugged into a power port of the PAM, an external power source that is brought into close proximity of the PAM that may be similar to a cordless toothbrush charging port, and/or an external power source that transmits a power signal for wireless charging the PAM from a distance greater than an inch.

To consume small amounts of power and thereby extending battery life, a goal of an embodiment of the PAM without recharge or replacement support, the primary consumer of power will likely be the processor core; therefore the device life may be essentially estimated to be expressed as a fixed number of firmware instructions. Battery life then directly correlates to software complexity. Avoiding 'typical' motion sensing algorithms that require floating-point math operations and/or trigonometric operations can reduce power consumption by (on the order of) 90%. Techniques for facilitating reductions in power consumption while providing acceptable levels of activity monitoring are described herein.

Techniques for sensing activity via the motion sensing sub system 614 that may reduce power consumption as described herein may include one or more of the following. A first method of measuring motion would be for the processor to capture acceleration data from the motion sensing sub system and/or directly from one or more of the accelerometers to determine at least three axis acceleration, convert this data to a vector and magnitude, perform some signal filtering, and compare the result to a model. This however requires significant computation and a fairly fast sampling rate, which in turn require large software libraries, additional RAM and ROM to run them, and fast clock speeds, all of which consumes a potentially unacceptable amount of power.

A second technique that may significantly reduce the power consumption of the PAM may include using an adaptive threshold trigger analysis (or 'ATTA'). The processor 602 may set an acceleration threshold value for each axis of the motion sensing sub-system 614 (e.g. inside each accelerometer), which may facilitate the motion sensing sub-system 614 to notify (e.g. trigger) the processor 602 only when that value is exceeded. The processor may then only need to measure the time between triggers to determine an aspect of pet activity. If these triggers are very close together then the processor 602 may raise the threshold value; conversely if the time between triggers is long then the threshold value can be lowered. In this way, pet activity can be determined with reasonable accuracy from threshold value and threshold trigger time analysis (e.g. frequency of trigger events such as counts per second). Additional discretion to further improve activity determination may be obtained from the pattern of the events. Since the processor 602 may be put in a lower power mode between threshold events dramatic power savings can be realized.

Figure 7:
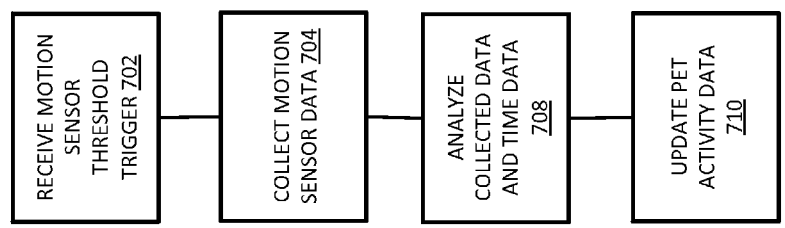
FIG. 7 depicts a flow chart for collecting motion data with a pet activity monitor.

Referring to FIG. 7, which depicts a flow chart for collecting motion data with a pet activity monitor, a processor may receive a motion sensor threshold trigger at step 702 that may indicate an acceleration threshold set by the processor has been exceeded. The processor may collect motion sensor data at step 704, such as an identification of the axis for which the trigger has been generated, a time of trigger, and the like for analysis in the next step. The processor may analyze the collected trigger and/or time data to determine an aspect of pet activity at step 708. The processor may update pet activity data, such as by storing updated pet activity data related information in a memory at step 710.

Figure 8:
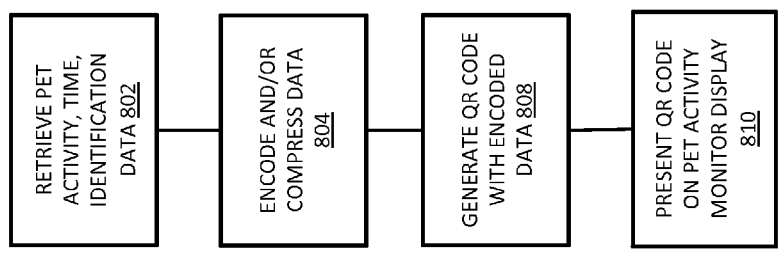
FIG. 8 depicts a flow chart for generating and presenting a QR code with a pet activity monitor.

Referring to FIG. 8, which depicts a flow chart for generating and presenting a QR code with a pet activity monitor, information for use in generating a QR code may be gathered in step 802. This information may include predetermined data such as pet identification, branding information, and the like. This information may also include time variable information, such as pet activity data, time/calendar data, and the like. A processor may encode and/or compress the gathered information to facilitate delivery of a larger amount of information in the QR code than code be delivered without at least one of encoding and/or compressing. The processor may generate a QR code in step 808 that represents at least the predetermined data and the time variable information as encoded and/or compressed in step 804. The processor may then present the generated QR code on a display of a pet activity monitor in step 810.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A pet activity monitor with a multi-axis motion detector for facilitating derivation of physical activity data, wherein the pet activity monitor is adapted to display a QR-code comprising a representation of the physical activity data and to generate a pet-food related recommendation for a pet associated with pet activity based on the physical activity data of the pet.

2. The pet activity monitor of claim 1, wherein the representation of the physical activity data comprises a compressed version of the collected physical activity data.

3. The pet activity monitor of claim 1, wherein the representation of the physical activity data comprises an encoded version of the collected physical activity data.

4. The pet activity monitor of claim 1, wherein the representation of the physical activity data comprises at least two portions including an activity data portion and an identification data portion.

5. The pet activity monitor of claim 1, wherein the pet activity monitor is adapted to be attached to a pet collar.

6. The pet activity monitor of claim 1, wherein the multi-axis motion detector comprises a plurality of accelerometers, each accelerometer configured with a programmable acceleration trigger threshold value and to generate an acceleration trigger when acceleration detected by each accelerometer exceeds the acceleration trigger threshold.

7. A physical activity monitoring and display device adapted to be worn by a living animal, wherein the device is adapted to display a QR-code comprising identification, animal-specific food recommendation and physical activity information of the animal.

8. The physical activity monitoring and display device of claim 7, wherein the QR-code comprises an encoded representation of the physical activity information.

9. The physical activity monitoring and display device of claim 7, comprising a motion sensing sub system for detecting acceleration of the wearer along a plurality of axes, and wherein the physical activity information of the wearer is derived therefrom.

10. A method of QR code generation for presentation on an electronic display of a pet activity monitor, comprising:
  capturing acceleration data for a plurality of axes;
  analyzing the captured acceleration data to determine physical activity of a pet associated with the pet activity monitor;
  encoding the physical activity as a physical activity data set;
  generating a pet-food related recommendation based on the physical activity;

generating a QR code that represents the physical activity data set and at least one other type of data; and presenting the QR code on a display of the pet activity monitor.

11. The method of claim 10, wherein capturing acceleration data comprises receiving a trigger from an accelerometer that indicates that acceleration along an acceleration detection axis exceeds an acceleration trigger threshold value.

12. The method of claim 11, wherein the acceleration trigger threshold is adaptively adjusted by a processor based on frequency of occurrence of receiving a trigger.

13. The method of claim 10, wherein analyzing the captured acceleration data to determine physical activity data comprises processing acceleration data for a plurality of axes and time data related thereto with a model of pet activity.

14. The method of claim 10, wherein the at least one other type of data represented by the QR code is identification data of at least one of the pet and the pet's caretaker.

15. The method of claim 10, wherein the QR code comprises data representing the pet-food related recommendation.

16. The method of claim 10, wherein the display of the pet activity monitor includes an array of pixels that accommodate presenting at least a version 1 QR code in its entirety.

17. The method of claim 10, wherein the display of the pet activity monitor is configured with an array of pixels having twenty-one rows and twenty-one columns.

18. The method of claim 10, wherein the pet activity monitor comprises a processor electrically connected to a motion sensor sub system and a display, wherein a battery powers each of the processor, motion sensor sub system, and display.

19. The method of claim 18, wherein the motion sensor sub system comprises one or more of multi-axis accelerometers and single-axis accelerometers.

* * * * *